(12) United States Patent
Huda et al.

(10) Patent No.: US 7,127,983 B2
(45) Date of Patent: Oct. 31, 2006

(54) BREW BASKETS FOR BEVERAGE BREWING SYSTEMS

(75) Inventors: Stephen P. Huda, Shelton, CT (US); Shirley S. Ma, South Glastonbury, CT (US); Lawrence S. Walters, Jr., Woodbridge, CT (US)

(73) Assignee: KX Industries, L.P., Orange, CT (US)

( * ) Notice: Subject to any disclaimer, the term of this patent is extended or adjusted under 35 U.S.C. 154(b) by 81 days.

(21) Appl. No.: 10/666,007

(22) Filed: Sep. 19, 2003

(65) Prior Publication Data

US 2004/0118297 A1 Jun. 24, 2004

Related U.S. Application Data

(60) Provisional application No. 60/412,077, filed on Sep. 20, 2002.

(51) Int. Cl.
*A47J 31/00* (2006.01)

(52) U.S. Cl. .............................. 99/306; 99/318; 99/323; 99/286

(58) Field of Classification Search ................... 99/306, 99/316, 317, 318, 319, 323, 286; 210/473, 210/474, 477, 479

See application file for complete search history.

(56) References Cited

U.S. PATENT DOCUMENTS

| 3,361,052 | A | | 1/1968 | Weber |
| 4,446,158 | A | | 5/1984 | English et al. |
| 4,520,716 | A | | 6/1985 | Hayes |
| 5,370,041 | A | | 12/1994 | Lowe |
| 5,505,120 | A | * | 4/1996 | Albertson .................... 99/286 |
| 5,967,019 | A | * | 10/1999 | Johnson et al. ............... 99/323 |
| 6,103,116 | A | | 8/2000 | Koslow et al. |
| 6,481,338 | B1 | * | 11/2002 | Wai .......................... 99/302 R |
| 6,517,880 | B1 | * | 2/2003 | Walters et al. .............. 426/433 |

* cited by examiner

*Primary Examiner*—Reginald L. Alexander
(74) *Attorney, Agent, or Firm*—DeLio & Peterson, LLC

(57) ABSTRACT

A brew basket of the present invention useful in drip-style beverage brewing systems comprises a brewing chamber and a filter having replaceable filter medium pivotably attached to and in fluid communication with the brewing chamber, wherein the replaceable filter medium is sealably supported on an annular flange of the filter. The brewing chamber and the filter are two separate components mated together to provide a substantially leak-proof seal. By integrating the filter in the brew basket in an open and obvious position with a replaceable filter medium disk, a user has convenient access to the filter medium for improved compliance in regularly replacing the filter medium.

2 Claims, 4 Drawing Sheets

# BREW BASKETS FOR BEVERAGE BREWING SYSTEMS

This application claims the benefit of Provisional Application No. 60/412,077, filed Sep. 20, 2002.

This invention is directed to brew baskets for beverage brewing systems, such as coffee makers, having incorporated therein an apparatus for removing contaminants in the brewing liquid.

SUMMARY OF THE INVENTION

The present invention is directed to, in a first aspect, a brew basket for a beverage brewing system comprising of: a brewing chamber having an aperture to allow flow of a brewed beverage to exit the brewing chamber; and a filter including a replaceable filter medium pivotably attached to and in fluid communication with the brewing chamber, wherein the replaceable filter medium is sealably supported on an annular flange of the filter.

In another aspect, the present invention is directed to a beverage brewing system comprising of: a brew basket comprising a brewing chamber having an aperture to allow flow of a brewed beverage to exit the brewing chamber; and a filter including a replaceable filter medium, the filter pivotably attached to and in fluid communication with the brewing chamber, wherein the replaceable filter medium is sealably supported by an annular flange of the filter.

The filter can flip up to expose the brewing chamber; swing to one side of the brewing chamber to expose an interior of the brewing chamber; or the brewing chamber can swing to one side while the filter can flip up to expose the brewing chamber. Preferably, the filter and the brewing chamber are mated to provide a substantially leak-proof seal.

The replaceable filter medium can have a rim surrounding the filter medium wherein the rim surrounding the replaceable filter medium is one of snap fitted, press fitted, or wipe sealed onto the annular peripheral shelf. The filter may further include a filter frame having an annular side wall extending above the replaceable filter medium to provide a reservoir for a brewing liquid.

The brew basket or components thereof may further include an indicator to indicate to a user that the replaceable filter medium disk needs to be exchanged with a fresh filter medium disk.

In yet another aspect, the present invention is directed to a method of making a brewed beverage comprising the steps of: providing a brewed beverage system comprising a brew basket including a brewing chamber containing beverage brewing ingredients, the brewing chamber having an aperture to allow flow of the brewed beverage to exit the brewing chamber, and a filter including a replaceable filter medium in fluid communication with the brewing chamber; heating a liquid within the brewed beverage system; contacting the heated liquid with the replaceable filter medium wherein the replaceable filter medium removes substantially all contaminants in the heated liquid; mixing the substantially contaminant-free heated liquid with the beverage brewing ingredients. The method may further include the steps of collecting a brewed beverage as it exits the brewing chamber and/or replacing the filter medium.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) which follows taken in conjunction with the accompanying drawings in which:

DETAILED DESCRIPTION OF THE PREFERRED EMBODIMENT(S)

Figure 1:
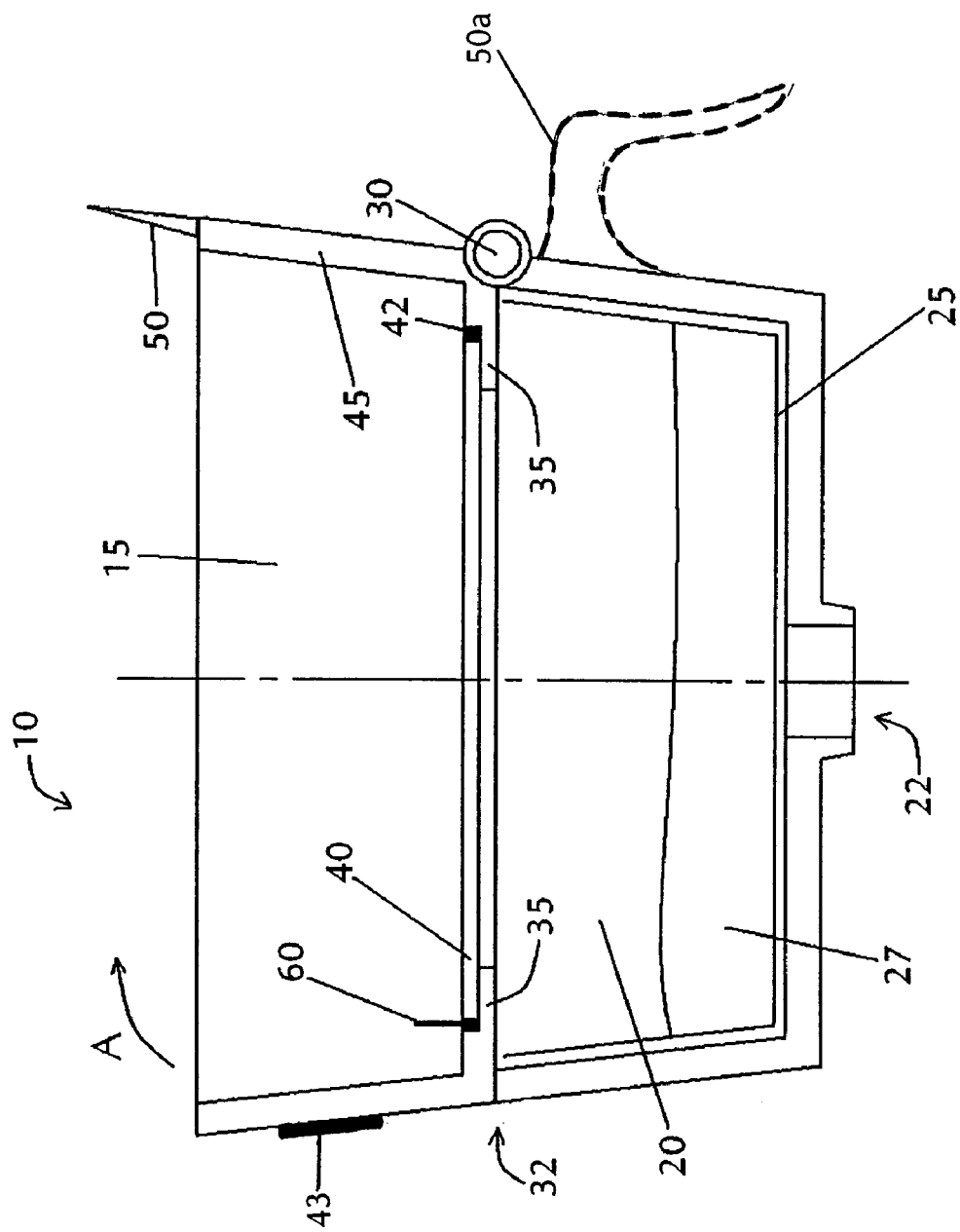
FIG. 1 is a cross-sectional view of a brew basket of the present invention.

In describing the preferred embodiment of the present invention, reference will be made herein to FIGS. 1 to 4 of the drawings in that like numerals refer to like features of the invention. Features of the invention are not necessarily shown to scale in the drawings.

The improved brew basket of the present invention is formed to receive a replaceable filter medium onto or into the top of a specially designed brew basket of a drip-style coffee maker. The replaceable filter medium can be used with a supporting filter frame secured to the brew basket via a pressure fit, clip, snap, and/or connected with a pivoting mechanism such as a hinge or a pivot post frame. The replaceable filter medium sits inside the brew basket on a support means such as a shelf, tab, flange or ridge within the filter frame. Although this invention is most useful in coffee makers, it would also apply to all other types of beverage brewing systems where a filtered brewing liquid is preferred to improve the taste and odor of the brewed beverage.

In FIG. 1 is shown one embodiment of the present invention. A brew basket 10 of the present invention has a filter 15 in fluid communication with a brewing chamber 20 for receiving a containment filter 25 for the beverage brewing ingredients 27 contained therein. Containment filter 25 can be made of paper, plastic, metal mesh or other suitable materials that are permeable to the brewing liquid yet will contain the beverage brewing ingredients. Brewing chamber 20 may hold one or more beverage brewing ingredients, such as coffee grounds, tea leaves, and/or spices. Brewing chamber 20 has an aperture 22 to allow the flow of the brewed beverage to exit brewing chamber 20 and into a carafe or other receptacle for collecting the brewed beverage.

Filter 15 sits on a top edge 32 of brewing chamber 20 and is attached to or at the top edge 32 of brewing chamber 20 with a pivoting mechanism, such as a hinge 30, on one side of brew basket 10 so that a user can flip filter 15 in the direction of arrow A to expose the interior of brewing chamber 20 to allow placement of containment filter 25 and beverage brewing ingredients 27. A fastening means (not shown), if necessary, can be located at one or more points on top edge 32 across brew basket 10 and opposite hinge 30, in order to secure filter 15 on the top edge 32 of brew basket 10. Any appropriate fastening means can be used such as, for example, a snap fit, pressure fit, clip type fastener at one or more points along the top edge 32 of brewing chamber 20 or the entire top edge 32 can be, for example, a wipe seal or a press seal, such that flip-top filter 15 is sealably engaged on top edge 32 of brewing chamber 20.

Figure 2:
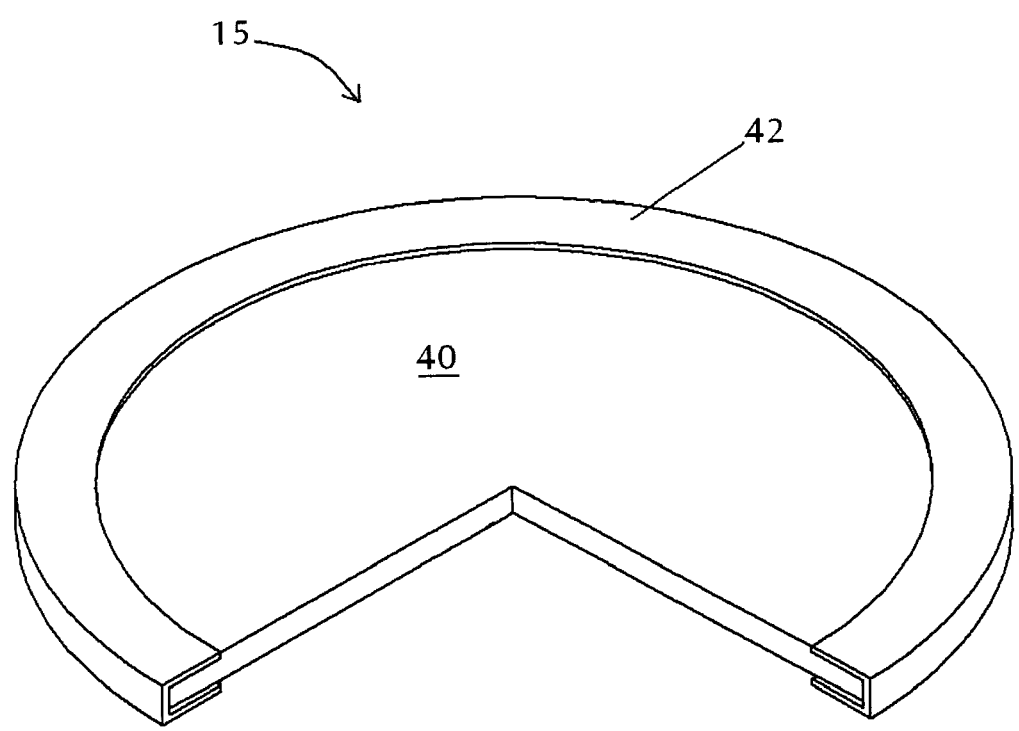
FIG. 2 is a perspective view of a flat sheet, laminar filter medium useful in the brew basket of the present invention.

Filter 15 includes a laminar, flat sheet filter medium 40 that is sealably supported on a flange 35. Such filter medium can also be configured as a high-lofted material or a pleated flat sheet material and finished as described below. Filter medium 40 can be made as a replaceable filter medium disk. Preferably, an annular, peripheral rim 42 is molded around filter medium 40 as shown in FIG. 2. Filter medium 40 is hot stamped, which seals the edges of filter medium 40, and cut to the desired shape. A thermoplastic or thermoset material is then, preferably, insert molded around filter medium 40 to form rim 42. Hot stamping and cutting filter medium 40 may be accomplished in one integrated step, rather than two separate steps. Rim 42 can have a plurality of inwardly extending support members (not shown), such as a spoke and wheel arrangement to hold filter medium 40 securely therein. Support members can also be configured as a mesh, lattice, grille or fins, and is preferably made of the same material as or integrally formed as part of the rim. The surface area of filter medium 40 should be made as large as reasonably possible within the practical constraints supporting the filter medium. Filter medium 40 within its rim can be adapted to snap-fit into filter 15 to provide a substantially leak-proof seal. To provide easier handling of the replaceable filter medium disk, a handle or tab 60 can extend from the rim.

Filter medium 40 may be of any type including separating mediums and adsorbing mediums. For example, metallic mesh screens, spun-bonded or melt-blown polymeric nonwoven materials, glass fibers, porous membranes, and paper may be used as separating mediums. Adsorbing mediums include iodinated resin, activated carbon, activated alumina, silicates, ion-exchange resins, manganese or iron oxides, and other materials having well-defined pore structures due to a high degree of crystallinity, such as zeolites. An indicator 43 can be incorporated into the brew basket or filter medium to indicate to a user that the filter medium disk needs to be replaced with a fresh filter medium disk. Such indicators are known in the art and can be placed elsewhere on the brew basket other than as shown in FIG. 1. Preferably, filter medium 40 is hydrophilic to provide suitably high flow and minimal pressure drop, when the brewing liquid in passed therethrough. Filter 15 is fitted to receive a filter medium 40 of any type, but preferably a thin, flat-sheet activated carbon filter medium such as PLEKX®, commercially available from KX Industries, L.P., Orange, Conn., and disclosed in U.S. Pat. No. 5,792,513.

Frame 45 of filter 15 extends upward to provide a reservoir above filter medium 40 for the brewing liquid since the liquid may exit aperture 22 more quickly than it can pass through filter medium 40. Preferably, frame 45 is shaped to conform to the generally inverted conical configuration of brewing chamber 20 with similarly sloped side walls such that the brewing liquid will drip towards the beverage brewing ingredients. Flange 35 of frame 45 helps to support and level filter 15 when placed in the downward operative position. The top edge 32 of brewing chamber 20 can be grooved to receive filter 15 or otherwise designed so as to mate with filter 15 and, thus, create a robust seal when filter 15 is in the operative position. A robust seal will ensure that substantially all brewing liquid directed to beverage brewing ingredients 27 will indeed pass through filter medium 40. This is particularly important when the brewing liquid outlet is offset from the center of filter 15.

A handle 50 connected to frame 45 is provided for removing brew basket 10 from a drip style coffee maker (not shown). Handle 50 is shown in FIG. 1 attached to frame 45 of filter 15, where it is useful for those coffee makers wherein the brew basket is pulled up and out of such coffee makers. A handle 50a (shown in dashed lines), can be attached at brewing chamber 20 for those commercial-style coffee makers wherein the entire brew basket slides in and out of the coffee maker.

To operate a beverage brewing system of the present invention including the specialized brew basket described in FIG. 1, a user would initially load a laminar, flat sheet filter medium into the filtration portion of the brew basket by securing the filter medium into the filter, or by replacing the filter in its entirety, and securing it in place along the top edge of the brewing chamber of the brew basket. To make the brewed beverage, the user would then, and each time thereafter, lift up the filter that holds the filter medium, place the usual containment filter and beverage brewing ingredients into the brewing chamber, place the filter down on top of the brewing chamber, and place the brew basket into the operative position in the beverage brewing system. Water is heated within the beverage brewing system and contacted with the filter medium. The filter medium removes contaminants, thereby creating a substantially pure, heated liquid that enters the brewing chamber to mix with the beverage brewing ingredients. The resulting brewed liquid is then collected in a carafe or other vessel as it exits the brewing chamber.

Figure 3:
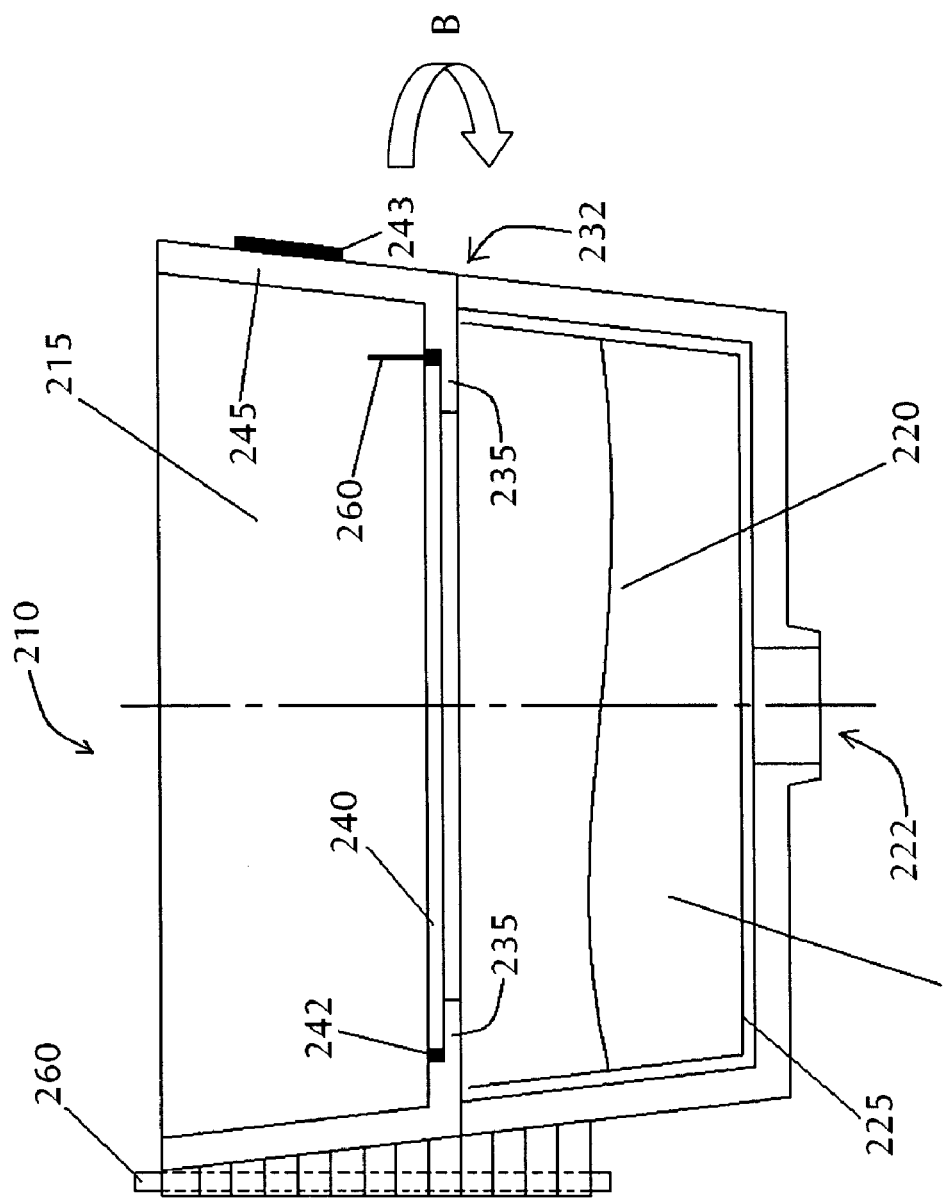
FIG. 3 is a cross-sectional view of yet another brew basket of the present invention.

In FIG. 3 is shown another embodiment of a brew basket 210 of the present invention wherein the brew basket and filter are similarly described as in FIG. 1. However, filter 215 is fastened to the top edge 232 of brew basket 210 via a pivoting means 260 located at one point of the brew basket rather than hinge 30 shown in FIG. 1. This configuration allows filter 215 to swing to the side in the direction of arrow B, rather than be lifted up to provide access to the interior of brewing chamber 220. In the operative position, filter 215 is concentric with brewing chamber 220. Pivoting means 260 is preferably molded into brew basket 210 such that brewing chamber 220 and filter 215 each swing independently of each other and to the beverage brewing system. In those beverage brewing systems wherein the brewing liquid outlet is offset, it may be advantageous to provide a substantially leak-proof seal there between to ensure that the brewing liquid is directed to pass through filter medium 240. However, in most beverage brewing systems, the brewing liquid outlet is centered over beverage brewing ingredients 227, and a substantially leak-proof seal may not be required as the majority of the brewing liquid will be directed over the filter medium 240.

To operate the beverage brewing system that includes brew basket 210, a user may swing open the filter to place or replace a disk of filter medium therein. The brewing chamber is swung open for placement of the containment filter and beverage brewing ingredients are placed into the containment filter. The filter and brewing chamber can be fitted together so that they are concentric with each other prior to swinging back into the operative position within the beverage brewing system. Alternatively, each component can be swung into its operative position within the beverage brewing system separately. Water is heated within the beverage brewing system and contacted with the filter medium. The filter medium removes contaminants, thereby creating a substantially pure, heated liquid that enters the brewing chamber to mix with the beverage brewing ingredients, and the resulting brewed liquid is then collected in a carafe or other vessel as it exits the brewing chamber.

Figure 4:
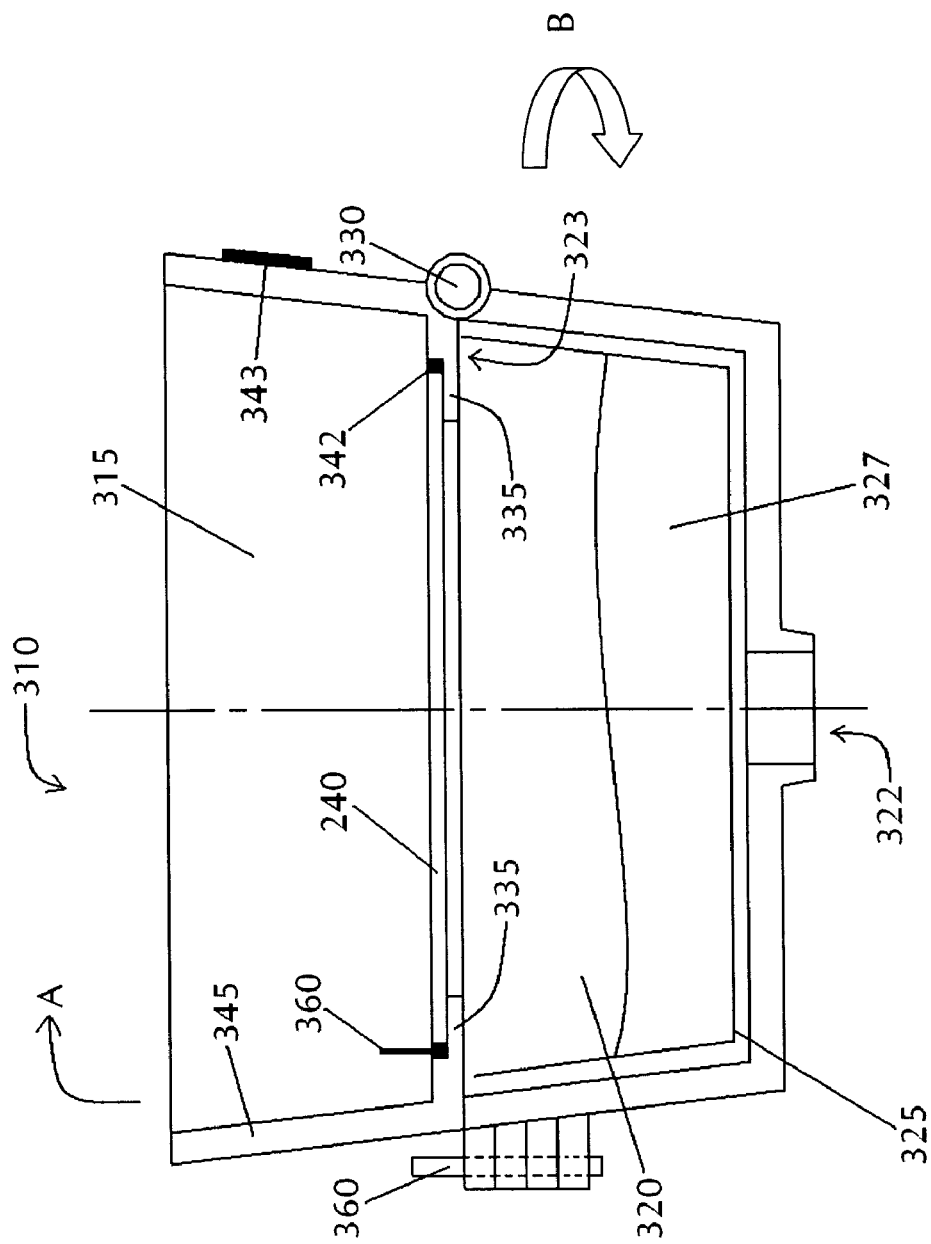
FIG. 4 is a cross-sectional view of still yet another brew basket of the present invention.

FIG. 4 shows yet another embodiment of a brew basket of the present invention with like features of the brew basket similarly described above in FIG. 1 with the numeral "3"

preceding each reference number. In this embodiment, brew basket 310 can pivot out of a beverage brewing system in the direction of arrow B utilizing pivot mechanism 360 and wherein filter 315 flips open in the direction of arrow A to expose brewing chamber 320 via hinge 330. To provide facilitate handling of the replaceable filter medium disk, a handle or tab 60 can extend from the rim. To operate a beverage brewing system of the present invention including the specialized brew basket described in FIG. 4, a user would swing the brew basket out of the beverage brewing system in direction B and insert or replace the flat sheet replaceable filter medium. Once the replaceable filter medium is secured, to make the brewed beverage, the user would then, and each time thereafter, lift up the filter that holds the filter medium in the direction of arrow A, place the usual containment filter and beverage brewing ingredients into the brewing chamber, and place the filter down on top of the brewing chamber such that the filter and brewing chamber are concentric to each other. The brew basket is then swung back into position within the beverage brewing system. Water is heated within the beverage brewing system and contacted with the filter medium. The filter medium removes contaminants, thereby creating a substantially pure, heated liquid that enters the brewing chamber to mix with the beverage brewing ingredients, and the resulting brewed liquid is then collected in a carafe or other vessel as it exits the brewing chamber.

The brew baskets of the present invention can be made from any suitable material according to known molding techniques in the art, and preferably is made from a suitable thermoplastic or thermoset material or metal.

By integrating the filter medium in the brew basket in an open and obvious position as a replaceable filter medium disk or replacing the filter in its entirety, a user has convenient access to the filter medium. Thus, the user is more inclined to regularly replace the filter medium and continually enjoy a brewed beverage that is substantially contaminant free with improved taste.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A brew basket for a beverage brewing system comprising of:
    a brewing chamber having an aperture to allow flow of a brewed beverage to exit said brewing chamber; and
    a filter including a replaceable filter medium, the filter pivotably attached by pivoting means to and in fluid communication with said brewing chamber, wherein the replaceable filter medium is sealably supported on an annular flange of said filter; said filter is attached to said brewing chamber by pivoting means consisting of a hinge; and said brewing chamber is pivotably attached to a beverage brewing system wherein when said brewing chamber is swung out of its operative position in a beverage brewing system, said filter has flip means which can flip up to expose said brewing chamber.

2. A beverage brewing system comprising of:
    a brew basket comprising a brewing chamber having an aperture to allow flow of a brewed beverage to exit said brewing chamber; and a filter including a replaceable filter medium, the filter pivotably attached by pivoting means to and in fluid communication with said brewing chamber, wherein the replaceable filter medium is sealably supported by an annular flange of the filter and said filter is attached to the brewing chamber with a hinge and the brewing chamber is pivotably attached to said beverage brewing system wherein when the brewing chamber is swung out of its operative position in said beverage brewing system, the filter can flip up to expose the brewing chamber.

* * * * *

UNITED STATES PATENT AND TRADEMARK OFFICE
CERTIFICATE OF CORRECTION

| | |
|---|---|
| PATENT NO. | : 7,127,983 B2 |
| APPLICATION NO. | : 10/666007 |
| DATED | : October 31, 2006 |
| INVENTOR(S) | : Walters, Huda and Ma |

It is certified that error appears in the above-identified patent and that said Letters Patent is hereby corrected as shown below:

On Title Page (74)
Delete the order of inventors, "Stephen P. Huda, Shirley S. Ma, Lawrence S. Walters, Jr.," and substitute therefor -- Lawrence S. Walters, Jr., Sephen P. Huda, Shirley S. Ma. --

Signed and Sealed this

Tenth Day of April, 2007

JON W. DUDAS
*Director of the United States Patent and Trademark Office*